United States Patent [19]
Faisandier

[11] 3,939,758
[45] Feb. 24, 1976

[54] PRESSURE SENSOR

[76] Inventor: Jacques Faisandier, 32, Bd Felix Faure, Chatillon-sous-Bagneux 92, France

[22] Filed: Oct. 17, 1973

[21] Appl. No.: 407,210

[52] U.S. Cl............................ 92/1; 73/406; 92/5 R; 92/94; 92/101; 92/102; 200/83 R; 200/83 W
[51] Int. Cl.²........................................ F15B 21/04
[58] Field of Search............ 92/94, 98 R, 98 D, 99, 92/100, 101, 102, 1, 5 R; 73/406; 200/83 R, 83 W

[56] References Cited
UNITED STATES PATENTS

| | | | |
|---|---|---|---|
| 1,085,818 | 2/1914 | Oxnard | 92/98 D |
| 2,405,466 | 8/1946 | Tabb | 92/94 X |
| 2,503,594 | 4/1950 | Phelps | 92/101 X |
| 3,025,877 | 3/1962 | Buckay | 92/94 X |
| 3,093,086 | 6/1963 | Altoz et al. | 92/102 X |
| 3,101,191 | 8/1963 | Wolfensperger | 92/102 X |
| 3,174,433 | 3/1965 | Roosa | 92/94 X |
| 3,393,612 | 7/1968 | Gorgens et al. | 92/101 |
| 3,466,978 | 9/1969 | Carlstedt | 92/101 X |
| 3,564,977 | 2/1971 | Davis | 92/101 |
| 3,626,814 | 12/1971 | Andersson | 92/98 R |

FOREIGN PATENTS OR APPLICATIONS

| | | | |
|---|---|---|---|
| 739,398 | 10/1955 | United Kingdom | 92/101 |
| 316,505 | 10/1956 | Switzerland | 92/102 |

*Primary Examiner*—Martin P. Schwadron
*Assistant Examiner*—Abraham Hershkovitz

[57] ABSTRACT

A sensor particularly well suited for use in the monitoring of hydraulic pressure. The sensor includes a deformable membrane mechanically coupled to an electrical switch. The membrane is mounted within a chamber in a manner which permits free radial displacement of the edge of the membrane and which also permits the axial position and shape of the membrane to be varied during assembly of the device.

10 Claims, 5 Drawing Figures

PRESSURE SENSOR

BACKGROUND OF THE INVENTION:

1. Field of the Invention

The present invention relates to the sensing of fluidic pressure. More specifically, this invention is directed to pressure sensors employing a deformable membrane coupled to the actuator of an electrical switch. Accordingly, the general objects of the present invention are to provide novel and improved methods and apparatus of such character.

2. Description of the Prior Art

Pressure sensors of the diaphragm or deformable membrane type are well known in the art. Thus, it is known to apply a pressure to be measured to one side of a flexible member supported in a chamber, a reference pressure or force being applied to the opposite side of the flexible member, and to couple movements of the flexible member to the contacts of an electrical switch. Prior art pressure sensitive devices of this type, however, have been primarily utilized in the sensing of pneumatic pressure. Attempts to employ the prior art devices in or modify the devices for the sensing of hydraulic pressure have typically resulted in a lack of reliability and, as a result of attempts to improve reliability, devices of unacceptable size, weight and complexity.

SUMMARY OF THE INVENTION:

The present invention overcomes the above briefly discussed and other deficiencies and disadvantages of the prior art by providing for the sensing of hydraulic pressure through the use of a diaphragm-type device of novel design. In accordance with this novel design a flexible membrane is mounted within a housing-defined chamber by means of a plurality of shims. A spacer element for positioning the shims is disposed in the chamber to which the pressure to be monitored is applied and this spacer element positions an annular shim which determines the position and shape of the membrane in the absence of pressure. The arrangement of supporting shims for the flexible membrane is such that radial displacement of the edge of the membrane is permitted when the membrane is deformed under the effect of an applied pressure.

Also in accordance with the present invention, an elastic counter-pressure may be applied to the membrane. Additionally, means may be provided to compensate for variations in the monitored pressure resulting from temperature excursions.

BRIEF DESCRIPTION OF THE DRAWING

The present invention may be better understood and its numerous objects and advantages will become apparent to those skilled in the art by reference to the accompanying drawing wherein like reference numerals refer to like elements in the several figures and in which:

FIG. 1 depicts in cross-section the elements of the invention lying to one side of the axis thereof;

Figure 1:
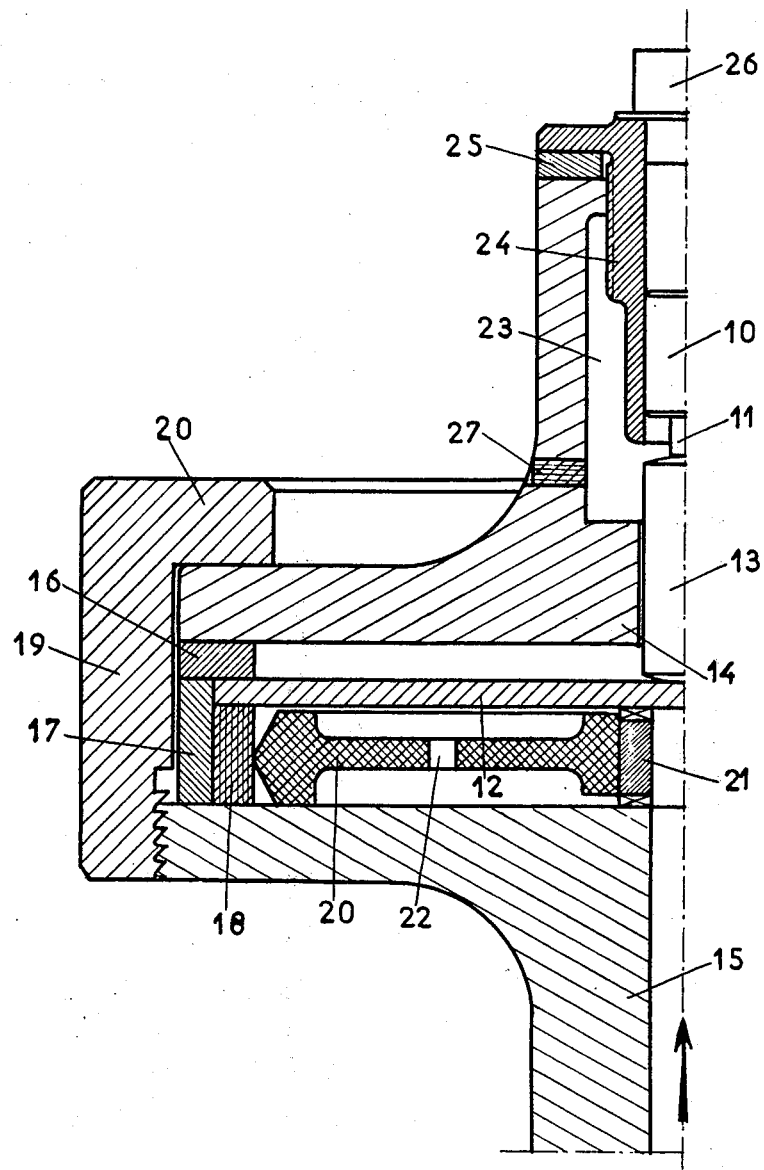
FIG. 1 is an axial section view of a preferred embodiment of the invention; i.e.

DESCRIPTION OF THE PREFERRED EMBODIMENTS:

With reference now to the drawing, and particularly to FIG. 1, it is to be noted that the electrical switch device 10 operated in response to movements of the flexible membrane 12 has been indicated in block form only since the switch mechanism itself does not comprise part of the invention. The switch 10 will typically have, extending therefrom, a movable finger 11 which is actuated by the flexible membrane 12 via a connecting rod or pin 13. The membrane 12 is positioned, in the manner to be described in detail below, in the chamber of a housing defined by respective upper and lower body portions 14 and 15 and a generally annular connecting member or strap 19.

Figure 5:
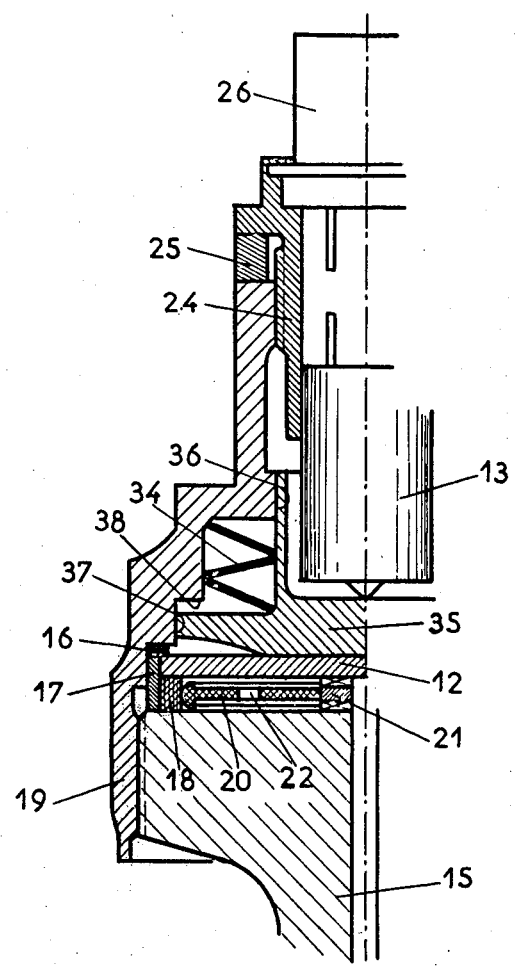
FIG. 5 is an axial view of another embodiment of the invention.

The membrane 12, for a given thickness, may comprise a single sheet of material as shown schematically in FIGS. 1 and 5 or may consist of a laminate of several membranes. The membrane 12 is supported at its periphery by a combination of three shims. These shims comprise an upper or packing shim 16, an outer or peripheral shim 17 and a resilient lower or supporting shim 18. Shims 16, 17 and 18 are fabricated from suitable materials with shim 18 typically being comprised of a rubber or similar material which provides an elastic force for holding the membrane 12 by its periphery against shim 16. This manner of support allows radial displacement of membrane 12 during pressure induced deformations.

The shims 16, 17 and 18 are located between body portions 14 and 15 of the sensor device as shown. Body portions 14 and 15 are in turn, locked together by means of the strap member 19 in the manner shown with the upper flange portion 20 of member 19 engaging the outer surface of portion 14. In the disclosed embodiment members 15 and 19 are provided with complementary threads whereby lower member 15 may be screwed into strap 19 after assembly of the other components of the invention. It is to be noted that the threads on body portions 15 and 19 are preferably of the artillary type in the interest of reducing the thickness of member 19 and thus reducing the overall weight of the sensor device.

As noted above, the resilient shim 18 is supprted about its outer periphery by the outer shim 17. The resilient shim 18 is held against shim 17 by a spacer member 20 which contacts the inner periphery of shim 18. Spacer member 20 is supported, at its radially inwardly disposed end, on an annular shim 21. In a preferred embodiment, the annular shim 21 contacts the membrane 12 so as to induce a slightly upwardly curved configuration thereto. The stresses which tend to form as the pressure develops are thus rendered relatively constant and the possibility of failure of the membrane due to structural fatigue is greatly reduced. The annular shim 21 is provided with suitable passages so as to permit the liquid, the pressure of which is being monitored, to be applied to the underside of membrane 12 via openings, such as opening 22, in the spacer member 20.

As previously noted, motion of membrane 12 is transmitted to the electrical switch device 10 by means of pin 13 and finger 11 which are capable of movement axially of the sensor device; the pin 13 sliding freely through an axial opening in the upper body portion 14. The switch device 10 is situated in a chamber 23 which may be formed integrally of the upper body portion 14 or defined by a separate member suitably attached to body portion 14. As indicated schematically in FIG. 1, the switch 10 is mounted, by any suitable means, within an auxiliary body 24 which is coaxial with the chamber 23; the auxiliary body 24 being attached by any suitable means to body portion 14 in the embodiment of FIG. 1. The degree of insertion of auxiliary body 24, and thus switch 10, into chamber 23 is adjustable by means of packing shims such as shim 25 thereby allowing precise adjustment of the pressure at which the switch 10 will be activated. An electrical connector, such as the socket indicated schematically at 26, may be conveniently situated in the auxiliary body 24 thereby facilitating electrical connection between the switch device 10 and remotely located equipment.

It is to be noted that means may be provided to relieve the pressure in chamber 23 should leakage, for example, from a ruptured membrane, permit the pressure about diaphragm 12 to rise dangerously. In FIG. 1 this means takes the form of a felt washer 27.

Figure 2:
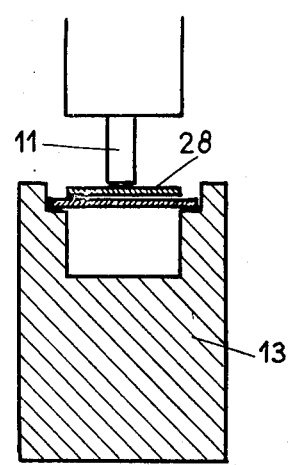
FIG. 2 is a schematic section view of the portions of a second embodiment of the invention employed to actuate an electrical switch.

In accordance with a novel feature of the invention, temperature compensation may be provided so as to permit the apparatus to operate over a wide range of operating temperatures such as, for example, −90°C to +130°C. In order to insure accurate operation with such varying environmental conditions, the material comprising pin 13 will be judiciously selected and will preferably comprise either Duraluminum or Ebonite. Additionally, referring to FIG. 2, a bimetallic insert 28 may be inserted between pin 13 and finger 11, the bimetallic insert 28 subtending a cavity in pin 13 and resting on a shoulder defined about the periphery of such cavity.

Figure 3:
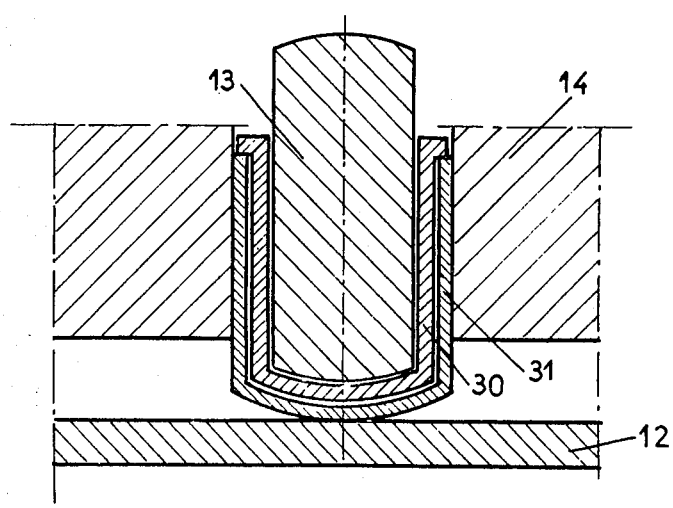
FIG. 3 is a schematical sectional view of an alternative actuator arrangement to that shown in FIG. 2.

As a further alternative mode of temperature compensation, shown in FIG. 3, pin 13 may be partially enclosed by metallic members 30 and 31 having widely different coefficients of expansion. By way of example, member 30 may be comprised of invar while member 31 may be comprised of dural or ebonite.

Figure 4:
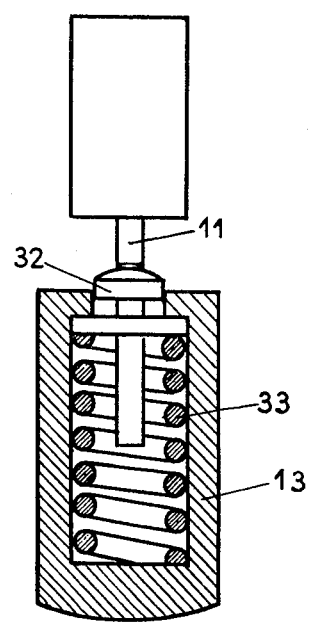
FIG. 4 is a schematic sectional view of a further alternative actuator arrangement to that shown in FIGS. 2 and 3.

A third mode of achieving temperature compensation is depicted in FIG. 4. In cases where the deflection of membrane 12 will be comparatively large, the pin 13 will be designed to include a thrust bearing 32 subjected to the action of a spring loaded thrust pin indicated generally at 33. The embodiment of FIG. 4 has the added advantage of providing over-travel compensation when the margin or additional travel following the triggering of the electrical switch 10 is inadequate. It will be understood that the temperature compensation schemes of FIGS. 2–4 can be used individually or in any desired combination.

Test results have shown that deformation of membrane 12 can be considered as proportional to the monitored pressure only if the device is working at fairly low pressures for which the membrane can be assimilated to a plane member. When membrane 12 takes on a marked curvature under the effect of pressure the resistance to deformation no longer increases linearly; i.e., the ratio df/dp diminishes at an increasing rate as pressure increases, f being the deflection. This effect also applies within the range of elastic deformations.

The first solution to this non-linearity problem consists of conferring on the flexible member an initial curvature in the inverse direction to the curvature which the pressure tends to produce on membrane 12. Since this inverse curvature can in practice be conferred only by deformation of a plane surface it is difficult to obtain with precision and homogeniety. In the case of the present invention the membrane 12 can, upon insertion, however be rendered substantially planar by choosing shim 21 to be of the correct height.

A second and preferable solution to the non-linearity problem retains the original plane characteristic of membrane 12 in manufacture and the height of shim 21 is selected such that the membrane is simply supported thereon in the rest position. Referring to FIG. 5, in the absence of an applied pressure, an elastic pressure is coupled to membrane 12 on the side thereof opposite to that to which the working pressure is applied. The embodiment of FIG. 5, therefore, is characterized by the application to membrane 12 of a calibration pressure developed by a spring 34. This calibration pressure counters premature deformation of membrane 12.

Continuing with a discussion of FIG. 5, the elastic counterpressure developed by spring 34 is applied, via a piston 35 having a broad flat head, to membrane 12. The spring 34 is grounded on an internal shoulder provided in body portion 14 of the pressure sensor device and exerts a predetermined force against the head 37 of piston 35. The piston 35 is guided jointly by piston rod 36 and head 37 along internal cylindrical guide surfaces formed in body portion 14. A gap 38 is provided between the piston head and a stop shoulder on body portion 14 to act as a buffer to avoid exaggerated stresses in the event of accidental excess pressure or during excess pressure testing. In the FIG. 5 embodiment the switch actuating pin 13 bears on the piston head 35 rather than directly on the membrane 12. The FIG. 5 embodiment allows distribution of the reactions between the spring and membrane and thereby enables the use of thinner membranes and permits a reduction in the operating pressure range.

To summarize several of the more significant features of the present invention, the membrane or diaphragm 12 is supported within the housing of the pressure sensor in a liquid tight manner but radial displacement of the edges of the membrane is permitted. A central shim or cam may be incorporated to determine the position and shape of the membrane in the absence of an applied pressure, thus increasing the fatigue strength, and deformation of the membrane is restricted mechanically upwards by the inner surface of the upper chamber defining body portion 14. The distance between the membrane and chamber wall are selected to be slightly greater than the normally expected deflection of the membrane. Accordingly, if the normally expected pressure is exceeded the membrane will flatten partially against the surface of portion 14 without suffering undue stress or damage. The membrane itself is preferably manufactured from flat stock thereby facilitating manufacture. Alternatively, the membrane may be of slightly curved configuration and a flat form obtained, if deemed necessary, during assembly of the pressure sensor. Various means may be provided to impart temperature compensation characteristics to the device. An electrical switch operated in response to excursions of the membrane may be mounted, in an adjustable manner, in the body of the pressure sensor itself.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. A pressure sensor comprising:

chamber defining means, said chamber defining means including first and second cover members, each of said cover members having a planar surface, said planar surfaces being disposed parallelly in opposed facing relationship, said chamber defining means further comprising clamping means for mechanically maintaining said cover members in spaced apart relationship to define a housing having an internal chamber;

a yieldable diaphragm;

means supporting said diaphragm within said chamber, said diaphragm dividing the chamber into two portions, said supporting means defining a resilient seal for preventing leakage of fluid between said chamber portions;

first spacer means disposed in said chamber between said cover member facing parallel surfaces, said first spacer means extending on both sides of said diaphragm and contacting said first and second cover members to define the width of said chamber;

read out means coupled to said diaphragm, said read out means including a freely movable connecting rod having oppositely disposed end faces, said connecting rod being at least in part disposed in a first of said chamber portions with a first end face contacting a first side of said diaphragm only in the central area of said diaphragm;

second spacer means positioned in the second of said chamber portions and extending radially outward substantially beyond the area of contact between the read out means connecting rod and said diaphragm, said second spacer means comprising a spacer member, said spacer member having a center aperture and contacting said supporting means about its periphery; shim means positioned in said spacer member center aperture, said shim means contacting and centering said spacer member and also contacting said diaphragm, said shim means determining the shape of said diaphragm in the absence of an applied pressure; and means for delivering pressurized fluid to one of said chamber portions.

2. The sensor of claim 1 wherein said first spacer means comprises:

a peripheral shim; and an upper packing shim, said upper shim being supported on said peripheral shim and cooperating therewith to determine the spacing between said chamber defining means first and second cover members.

3. The sensor of claim 1 further comprising:

means for biasing said diaphragm in opposition to the applied pressure.

4. The sensor of claim 1 wherein said read out means comprises:

output signal generating means;

means coupling pressure induced movements of said diaphragm to said output signal generating means; and means for compensating for variations in temperature, said temperature compensation means being connected to said coupling means.

5. The sensor of claim 4 wherein said coupling means comprises pin means and wherein said temperature compensation means comprises:

means disposed between said output signal generating means and said pin means for varying the length of said pin means with temperature.

6. The sensor of claim 4 wherein said coupling means comprises pin means and wherein said temperature compensation means comprises:

means disposed between said pin means and said diaphragm for varying the length of said pin means with temperature.

7. A pressure sensor comprising:

an upper chamber defining member;

a lower chamber defining member;

a peripheral shim;

an upper packing shim, said upper packing shim being supported on said peripheral shim and cooperating therewith to determine the spacing between said upper and lower chamber defining members;

annular clamp means for mechanically joining said upper and lower chamber defining members whereby said members and said peripheral and upper packing shims form a housing having an internal chamber;

a yieldable diaphragm dividing said internal chamber into two portions;

a resilient lower shim, a first side of said lower shim contacting said peripheral shim, a second adjacent side of said lower shim facing said upper shim and being spaced therefrom, the edge of said diaphragm being received in the space between said upper and lower shims and contacting one face of said peripheral shim, whereby said diaphragm is free to move in the radial direction;

a spacer member having a center aperture and contacting said lower shim on a third side thereof; shim means positioned in said spacer member center aperture, said shim means contacting and centering said spacer member and also contacting said diaphragm, said shim means determining the shape of said diaphragm in the absence of an applied pressure;

read out means coupled to said yieldable diaphragm, said read out means including a freely movable connecting rod having oppositely disposed end faces, said connecting rod being at least in part disposed in the portion of the internal chamber disposed on the same side of said diaphragm as said upper shim, a first end face of said connecting rod contacting a first side of said diaphragm only in the central area of said diaphragm; and means for delivering pressurized fluid to the chamber at one side of said diaphragm.

8. The sensor of claim 7 wherein said lower shim defines a seal for preventing leakage of fluid between the portions of said chamber on the opposite sides of said diaphragm and wherein said spacer member is positioned in the chamber portion disposed on the opposite side of said diaphragm from said connecting rod for maintaining the positioning of said lower shim.

9. The sensor of claim 8 further comprising:

means for biasing said diaphragm in opposition to the applied pressure.

10. The sensor of claim 8 wherein said read out means comprises:

output signal generating means;

means coupling pressure induced movements of said diaphragm to said output signal generating means; and
means for compensating for variations in temperature, said temperature compensation means being connected to said coupling means.

* * * * *